United States Patent
Fornage

(12) 
(10) Patent No.: US 10,193,347 B2
(45) Date of Patent: Jan. 29, 2019

(54) METHOD AND APPARATUS FOR IMPROVED BURST MODE DURING POWER CONVERSION

(71) Applicant: Enphase Energy, Inc., Petaluma, CA (US)

(72) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 810 days.

(21) Appl. No.: 13/853,239

(22) Filed: Mar. 29, 2013

(65) Prior Publication Data

US 2014/0293669 A1    Oct. 2, 2014

(51) Int. Cl.
| | |
|---|---|
| H02M 7/44 | (2006.01) |
| H02J 3/38 | (2006.01) |
| H02M 7/48 | (2007.01) |
| H02M 1/00 | (2006.01) |

(52) U.S. Cl.
CPC ............... H02J 3/385 (2013.01); H02M 7/48 (2013.01); *H02M 2001/0035* (2013.01); *Y02B 70/16* (2013.01); *Y02E 10/58* (2013.01)

(58) Field of Classification Search
CPC . H02M 3/33507; H02M 3/33523; H02M 7/48
See application file for complete search history.

(56) References Cited

U.S. PATENT DOCUMENTS

| | | | |
|---|---|---|---|
| 4,375,662 | A | 3/1983 | Baker |
| 4,404,472 | A | 9/1983 | Steigerwald |
| 4,649,334 | A | 3/1987 | Nakajima |
| 5,604,430 | A | 2/1997 | Decker et al. |
| 6,351,400 | B1 | 2/2002 | Lumsden |

(Continued)

FOREIGN PATENT DOCUMENTS

| | | |
|---|---|---|
| EP | 2042964 A2 | 4/2009 |
| EP | 2042965 A2 | 4/2009 |

(Continued)

OTHER PUBLICATIONS

"IEEE Recommended Practice for Utility Interface of Photovoltaic (PV) Systems," IEEE Std 929-2000, Approved Jan. 30, 2000, Copyright 2000 IEEE, 32 pages.

(Continued)

*Primary Examiner* — Nguyen Tran
*Assistant Examiner* — Monica Mata
(74) *Attorney, Agent, or Firm* — Moser Taboada

(57) ABSTRACT

A method for converting DC input power into AC output power comprising operating in a continuous mode, while the DC input power is at a first level, wherein DC input power is continuously converted into AC output power and applied to an AC power grid and upon detecting the DC input power is at a second level, operating in a burst mode, wherein a burst of AC output power for a half grid cycle is followed by a period of energy storage lasting an integer number of grid cycles.

20 Claims, 10 Drawing Sheets

(56) References Cited

U.S. PATENT DOCUMENTS

| | | | |
|---|---|---|---|
| 6,678,176 | B2 | 1/2004 | Lumsden |
| 6,809,942 | B2 | 10/2004 | Madenokouji et al. |
| 6,844,739 | B2 | 1/2005 | Kasai et al. |
| 6,919,714 | B2 | 7/2005 | Delepaut |
| 6,984,970 | B2 | 1/2006 | Capel |
| 7,053,506 | B2 | 5/2006 | Alonso et al. |
| 7,091,707 | B2 | 8/2006 | Cutler |
| 7,158,395 | B2 | 1/2007 | Deng et al. |
| 7,319,313 | B2 | 1/2008 | Dickerson et al. |
| 7,420,354 | B2 | 9/2008 | Cutler |
| 7,432,691 | B2 | 10/2008 | Cutler |
| 7,479,774 | B2 | 1/2009 | Wai et al. |
| 7,521,914 | B2 | 4/2009 | Dickerson et al. |
| 7,768,155 | B2 | 8/2010 | Fornage |
| 7,839,025 | B2 | 11/2010 | Besser et al. |
| 8,035,257 | B2 | 10/2011 | Fornage |
| 8,319,378 | B2 | 11/2012 | Fornage |
| 8,350,411 | B2 | 1/2013 | Kimball et al. |
| 8,492,932 | B1 | 7/2013 | Fornage |
| 2004/0207366 | A1 | 10/2004 | Sung |
| 2004/0264225 | A1 | 12/2004 | Bhavaraju et al. |
| 2005/0254191 | A1 | 11/2005 | Bashaw et al. |
| 2006/0001406 | A1 | 1/2006 | Matan |
| 2007/0159866 | A1 | 7/2007 | Siri |
| 2007/0221267 | A1 | 9/2007 | Fornage |
| 2008/0111517 | A1 | 5/2008 | Pfeifer et al. |
| 2008/0143188 | A1 | 6/2008 | Adest et al. |
| 2008/0183338 | A1 | 7/2008 | Kimball et al. |
| 2008/0290252 | A1 | 11/2008 | Leonhardt et al. |
| 2009/0079383 | A1* | 3/2009 | Fornage ............ G05F 1/67 320/101 |
| 2009/0218887 | A1 | 9/2009 | Ledenev et al. |
| 2010/0038968 | A1 | 2/2010 | Ledenev et al. |
| 2010/0091532 | A1 | 4/2010 | Fornage |
| 2011/0121652 | A1 | 5/2011 | Sella et al. |
| 2011/0267857 | A1 | 11/2011 | Fornage |
| 2013/0301322 | A1 | 11/2013 | Fornage |

FOREIGN PATENT DOCUMENTS

| | | | |
|---|---|---|---|
| EP | 2042965 | A2 | 4/2009 |
| JP | 07-191767 | A2 | 7/1995 |
| JP | 2001-145266 | A2 | 5/2001 |
| JP | 2002-165357 | A2 | 6/2002 |
| JP | 2008-178158 | A | 7/2008 |
| KR | 1020110085781 | A | 7/2011 |
| WO | WO2007/007360 | A2 | 1/2007 |
| WO | WO-2009120695 | A1 | 10/2009 |

OTHER PUBLICATIONS

Bower, Ward Isaac, "The AC PV Building Block Ultimate Plug-n-Play That Brings Photovoltaics Directly to the Customer," U.S. Department of Energy Contract DE-AC04-94AL85000, published Feb. 1,2003, pp. 1-4.

Nobuyoshi Mutoh and Takayoshi Inoue, "A Controlling Method for Charging Photovoltaic Generation Power Obtained by a MPPT Control Method to Series Connected Ultra-Electric Double Layer Capacitors", Industry Applications Conference, 39th IAS Annual Meeting, Conference Record of the 2004 IEEE Seattle, WA, USA, Oct. 3-7, 2004, 8 pages.

Bower, Ward et al., "Performance Test Protocol for Evaluating Inverters Used in Grid-Connected Photovoltaic Systems," DRAFT Oct. 2004, 44 pages.

Bower, Ward I. et al., "Innovative Micro-Inverter for the AC PV Building Block or AC Modules," Copyright 2005 by ASME, 6 pages.

Esram, T. and Chapman, P.L. "Comparison of Photovoltaic Array Maximum Power Point Tracking Techniques," IEEE Trans. Energy Conversion, vol. 22, No. 2, Jun. 2007, 11 pages.

Jantsch, M. & Verhoeve, C. W. G. "AC PV Module Inverters With Full Sine Wave Burst Operation Mode for Improved Efficiency of Grid Connected Systems at Low Irradiance," downloaded from the Internet, ftp://ftp.ecn.nl/pub/www/library/conf/14epsec/burstmod.pdf on Jan. 28, 2009 5 pages.

"Inverters, Converters, Controllers and Interconnection System Equipment for Use With Distributed Energy Resources," Underwriters Laboratories Inc., UL Standard 1741.1, May 7, 1999, downloaded from web site http://ulstandardsinfonet.ul.com/scopes/1741.html on Jun. 12, 2009, 1 page.

International Search Report and Written Opinion dated May 26, 2010 for PCT Application No. PCT/US2009/060148, 11 pages.

Solmetric, "Guide to Interpreting I-V Curve Measurements of PV Arrays", Mar. 1, 2011, 24 pages.

Supplementary European Search Report dated Apr. 12, 2012 for European Application No. 09819937.5-2210/2345143, 9 pages.

PCT International Search Report and the Written Opinion of the International Searching Authority, PCT/US2014/032036, dated Jul. 21, 2014, 11 pages.

Jin-Ho et al., "The Improved Burst Mode in the Stand-By Operation of Power Supply", IEEE Applied Power Electronics Conference and Exposition, vol. 1, pp. 426-432, Feb. 22, 2004.

Extended European Search Report dated Mar. 16, 2017 for Application No. 16200745.4.

* cited by examiner

METHOD AND APPARATUS FOR IMPROVED BURST MODE DURING POWER CONVERSION

BACKGROUND OF THE INVENTION

Field of the Invention

Embodiments of the present disclosure generally relate to power conversion and, more particularly, to a method and apparatus for improved burst mode operation.

Description of the Related Art

Solar panels have historically been deployed in mostly remote applications, such as remote cabins in the wilderness or satellites, where commercial power was not available. Due to the high cost of installation, solar panels were not an economical choice for generating power unless no other power options were available. However, the worldwide growth of energy demand is leading to a durable increase in energy cost. In addition, it is now well established that the fossil energy reserves currently being used to generate electricity are rapidly being depleted. These growing impediments to conventional commercial power generation make solar panels a more attractive option to pursue.

Solar panels, or photovoltaic (PV) modules, convert energy from sunlight received into direct current (DC). The PV modules cannot store the electrical energy they produce, so the energy must either be dispersed to an energy storage system, such as a battery or pumped hydroelectricity storage, or dispersed by a load. One option to use the energy produced is to employ one or more inverters to convert the DC current into an alternating current (AC) and couple the AC current to the commercial power grid. The power produced by such a distributed generation (DG) system can then be sold to the commercial power company.

PV modules have a nonlinear relationship between the current (I) and voltage (V) that they produce. A maximum power point (MPP) on an I-V curve for a PV module identifies the optimal operating point of the PV module; when operating at this point, the PV module generates the maximum possible output power for a given temperature and solar irradiance. Therefore, in order to optimize power drawn from a PV module, a power conversion device coupled to the PV module, such as an inverter or a microinverter, generally employs a maximum power point tracking (MPPT) technique to ensure that the PV module is operated at the current and voltage levels corresponding to its MPP. The MPPT acts to rapidly adjust the PV module operating current and voltage levels in response to changes in solar irradiance and/or temperature such that the PV module can continue to operate at the MPP.

During the time period required for an MPPT technique to bias a PV module to its MPP, for example, when the solar irradiance on a PV module changes from no irradiance to increasing irradiance or at a PV module/inverter initial activation, a power conversion device coupled to the PV module will suffer from a lower efficiency until the MPP is achieved. Additionally, a power conversion device coupled to a PV module generally will suffer from a lower efficiency when the PV module is operating at a low power, e.g., low irradiance. During low irradiance, a PV module and an associated inverter may operate so inefficiently that is it best for overall system efficiency to deactivate the PV module and/or its inverter until solar irradiance increases.

Therefore, there is a need in the art for a method and apparatus for improving operation of a PV module and inverter in achieving and tracking the maximum power point.

SUMMARY OF THE INVENTION

Embodiments of the present invention generally relate to a method and apparatus for converting DC input power to AC output power substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
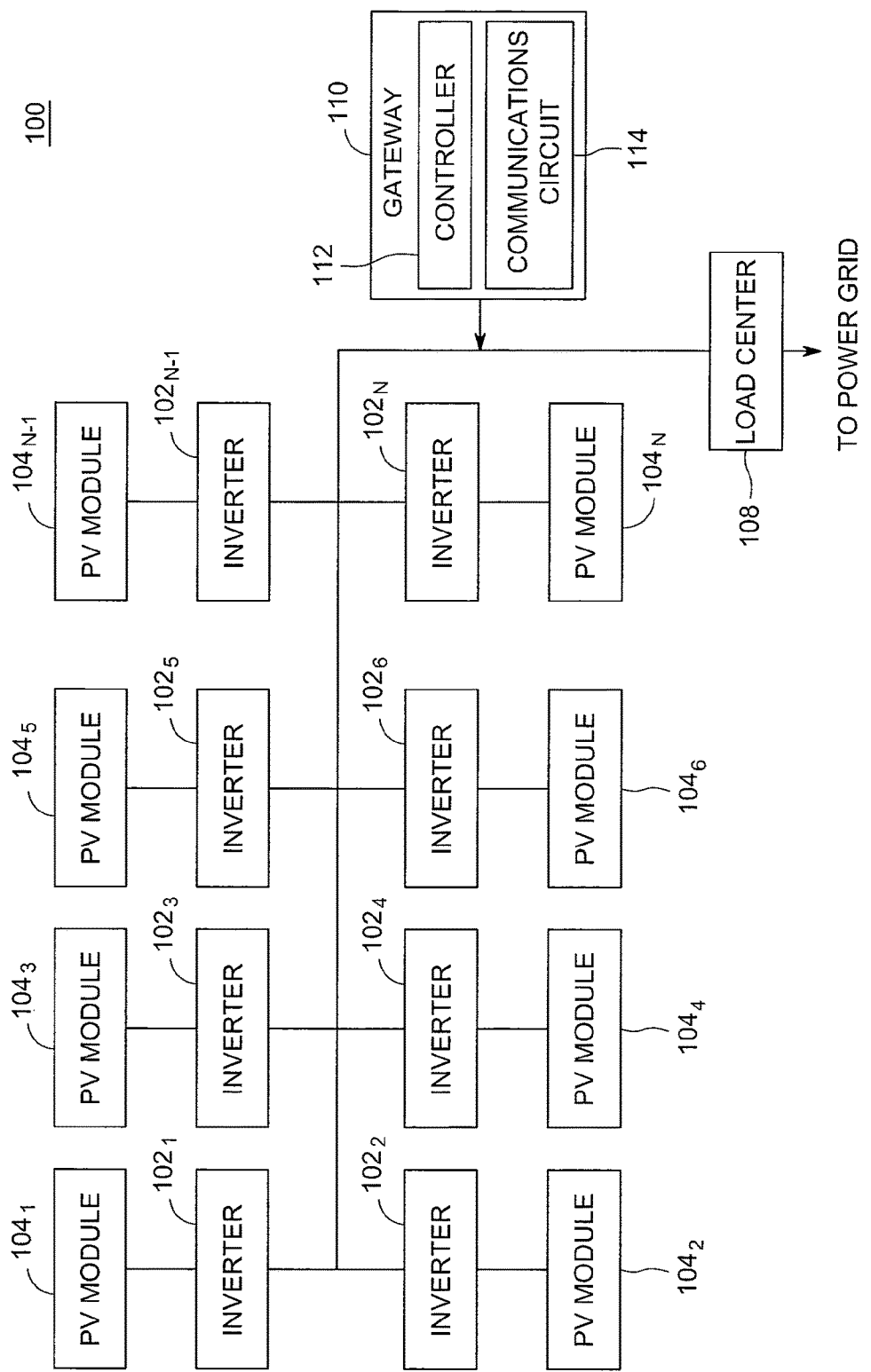
FIG. 1 is a block diagram of a system for distributed generation (DG) in accordance with one or more embodiments of the present invention.

FIG. 1 is a block diagram of a system 100 for distributed generation (DG) in accordance with one or more embodiments of the present invention. This diagram only portrays one variation of the myriad of possible system configurations. The present invention can function in a variety of distributed power generation environments and systems.

The system 100 comprises a plurality of inverters $102_1$, $102_2$ . . . $102_n$, collectively referred to as inverters 102, a plurality of PV modules $104_1$, $104_2$ . . . $104_n$, collectively referred to as PV modules 104, an AC bus 106, and a load center 108. The system 100 further comprises a gateway 110, which comprises a controller 112 and a communications circuit 114, coupled to the plurality of inverters $102_1$, $102_2 \ldots 102_n$. The gateway 110 acts as an optional controller for controlling power delivery to the load center 108, and further to the power grid.

Each inverter $102_1$, $102_2 \ldots 102_n$ is coupled to a PV module $104_1$, $104_2 \ldots 104_n$, respectively. In some embodiments, a DC-DC converter may be coupled between each PV module 104 and each inverter 102 (e.g., one converter per PV module 104). Alternatively, multiple PV modules 104 may be coupled to a single inverter 102 (i.e., a centralized inverter); in some embodiments, a DC-DC converter may be coupled between the PV modules 104 and the centralized inverter.

Each inverter 102 employs an MPPT technique to operate the subtending PV module 104 at its MPP such that the PV module 104 generates an optimal power output for a given temperature and solar irradiation. The inverters 102 are coupled to the AC bus 106, which in turn is coupled to the load center 108. The load center 108 houses connections between incoming power lines from a commercial power grid distribution system and the AC bus 106. The inverters 102 convert DC power generated by the PV modules 104 into AC power, and meter out AC current that is in-phase with the AC commercial power grid voltage. The system 100 couples the generated AC power to the commercial power grid via the load center 108.

In accordance with one or more embodiments of the present invention, the inverters 102 employ a "burst mode" during initial operation. In burst mode, the inverters 102 store energy over a period of time, e.g., one or more AC grid voltage cycles ("energy storage periods") and subsequently "burst" the stored energy to the commercial power grid ("burst periods"). The length of the energy storage periods is determined such that a ripple voltage overriding the PV module output voltage remains below a desired ripple voltage threshold.

In addition to improving the efficiency of the inverters 102, the burst mode facilitates a rapid convergence to the MPP utilizing an MPPT technique described below. Upon operating proximate the MPP, and if the PV modules 104 are supplying sufficient output power, the inverters 102 deactivate the burst mode and operate in a continuous mode, utilizing the MPPT technique to remain proximate to the MPP. In the event that the solar irradiance and/or temperature changes to a level such that the output power from the PV modules 104 drops below a burst mode threshold, one or more of the inverters 102 switch back to burst mode.

Figure 2:
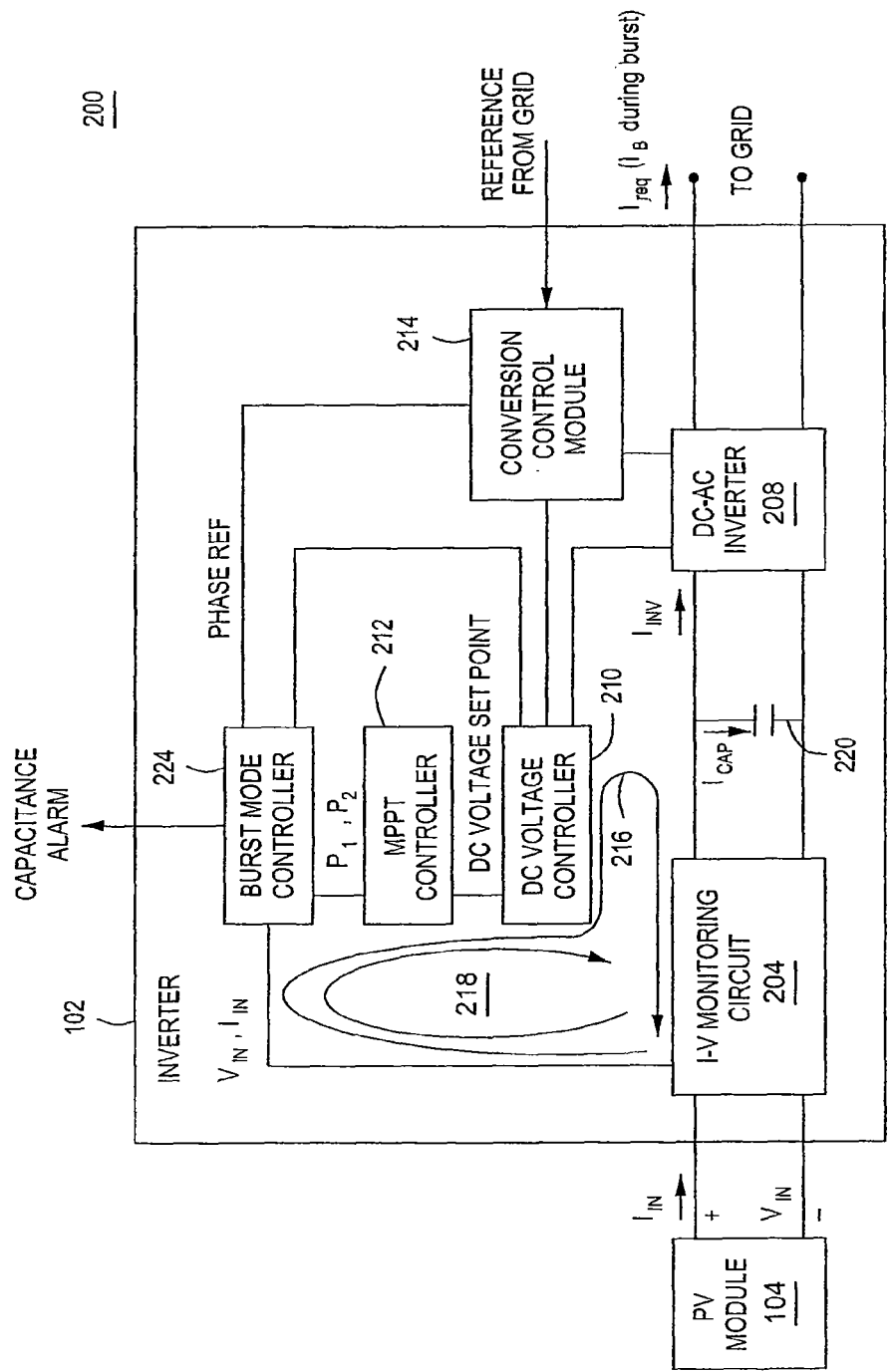
FIG. 2 is a block diagram of an inverter in accordance with one or more embodiments of the present invention.

FIG. 2 is a block diagram 200 of an inverter 102 in accordance with one or more embodiments of the present invention. The inverter 102 comprises an I-V monitoring circuit 204, a storage capacitor 220, a DC-AC inverter 208, a DC voltage controller 210, an MPPT controller 212, a burst mode controller 224, and a conversion control module 214. The inverter 102 is coupled to the PV module 104 and to the commercial power grid.

The I-V monitoring circuit 204 is coupled to the PV module 104, the storage capacitor 220, and the burst mode controller 224. Although the storage capacitor 220 is shown as an input capacitor, it may be located elsewhere in the inverter, such as within the DC-AC inverter between the DC/DC stage and the DC/AC stage. The burst mode controller 224 is further coupled to the DC voltage controller 210, the MPPT controller 212, and the conversion control module 214. Additionally, the MPPT controller 212 is coupled to the DC voltage controller 210, and the DC voltage controller 210 is coupled to the conversion control module 214. The DC voltage controller 210 functions to bias the PV module 104 at a DC voltage set point (i.e., a desired PV module operating voltage), while the MPPT controller 212 drives such DC voltage set point to correspond to the MPP voltage. The burst mode controller 224 functions to switch the inverter 102 between continuous mode and burst mode, and additionally measures input power from the PV module 104 that is utilized by the MPPT controller 212 in determining the DC voltage setpoint.

The I-V monitoring circuit 204 monitors the instantaneous input voltage and current, $V_{in}$ and $I_{in}$, respectively, from the PV module 104. The storage capacitor 220, in addition to being coupled to the I-V monitoring circuit 204, is coupled to the DC-AC inverter 208, and the DC-AC inverter 208 is further coupled to the DC voltage controller 210, the conversion control module 214, and the commercial power grid. A current $I_{cap}$ flows through the storage capacitor 220, and a current $I_{inv}$ flows to the DC-AC inverter 208.

The conversion control module 214 receives a reference signal from the commercial power grid, and provides the control signals for the DC-AC inverter 208 to convert the received DC current, $I_{inv}$, to a required AC output current, $I_{req}$. One example of such power conversion is commonly assigned U.S. Patent Application Publication Number 2007/0221267 entitled "Method and Apparatus for Converting Direct Current to Alternating Current" and filed Sep. 27, 2007, which is herein incorporated in its entirety by reference. The AC output current $I_{req}$ from the DC-AC inverter 208 is coupled to the commercial power grid such that it is in-phase with the commercial AC current.

The DC voltage controller 210 employs a first feedback loop (an "inner" loop) 216 to bias the PV module 104 at the DC voltage setpoint by modulating the current $I_{in}$ drawn from the PV module 104. The first feedback loop 216 comprises the I-V monitoring circuit 204, the burst mode controller 224, the MPPT controller 212, the DC voltage controller 210, and the DC-AC inverter 208. The DC voltage controller 210 receives a signal indicative of the PV module DC (i.e., average) input voltage $V_{DC}$ from the burst mode controller 224, and receives the DC voltage setpoint from the MPPT controller 212. Based on a difference between the $V_{DC}$ and the DC voltage setpoint, the first feedback loop 216 drives the DC-AC inverter 208 to generate $I_{req}$ such that the appropriate current $I_{in}$ is drawn from the PV module 104 to bias the PV module 104 at the DC voltage setpoint. Thus, the first feedback loop 216 iteratively computes a difference between the average PV module operating voltage and a DC voltage setpoint for the PV module 104, and accordingly adjusts the current $I_{in}$ drawn from the PV module 104 such that the PV module 104 is biased at the DC voltage setpoint (i.e., at an operating current and voltage that approximately corresponds to the MPP).

The MPPT controller 212 employs a second feedback loop 218 (an "outer" loop) to adjust the DC voltage setpoint such that it corresponds to the MPP voltage. The second feedback loop 218 comprises the I-V monitoring circuit 204, the burst mode controller 224, the MPPT controller 212, and the DC voltage controller 210. The burst mode controller 224 receives signals indicative of the instantaneous PV module input current and voltage, $I_{in}$ and $V_{in}$, respectively, through the I-V monitoring circuit 204, and computes the instantaneous input power, $P_{in}$, from the PV module 104. The burst mode controller 224 further processes the input power $P_{in}$, as described in greater detail below, to obtain a first and a second power measurement and provides such power measurements to the MPPT controller 212. The MPPT controller 212 determines a power difference between the first and second power measurements; based on the difference, the MPPT controller 212 determines whether the PV module operating voltage must be increased or decreased to reach the MPP, modifies the DC voltage setpoint accordingly, and supplies the new DC voltage setpoint to the DC voltage controller 210. Additionally, a power difference of zero indicates that the PV module 104 is currently biased at the MPP, and the MPPT controller 212 supplies the corresponding DC voltage setpoint to the DC voltage controller 210. The second feedback loop 218 thus iteratively determines whether the PV module 104 is operating proximate the MPP and, in the case where the PV module 104 is not operating proximate the MPP, modifies at least one operating parameter within the first feedback loop 216 to achieve the MPP (i.e., the outer loop "fine tunes" the setting established by the inner loop).

Upon initial operation or sufficiently low output power from the PV module 104, the burst mode controller 224 operates the inverter 102 in burst mode, wherein during energy storage periods (e.g., one or more AC grid voltage cycles of 16.67 msec), the storage capacitor 220 stores energy that is subsequently supplied to the DC-AC inverter 208 during a burst period. During burst mode, the burst mode controller 224 drives the DC voltage controller 210 such that the output current generated by the inverter 102, $I_{req}$, is a "burst mode current", $I_B$. Once the PV module 104 is operating proximate the MPP voltage, and if the PV module 104 is generating sufficient output power (i.e., if the PV module output power is greater than a pre-determined burst mode threshold), the burst mode controller 224 operates the inverter 102 in continuous mode. If the PV module output power subsequently drops below the burst mode threshold, the burst mode controller 224 switches the inverter 102 back to burst mode operation.

During energy storage periods of burst mode operation, the DC-AC inverter 208 is driven such that no output current is generated by the inverter 102 (i.e., $I_B$ is zero). During such periods, current is precluded from flowing to the DC-AC inverter 208, thereby causing current generated by the PV module 104 to charge the storage capacitor 220. The inverter 102 remains in an energy storage period for a number of AC grid voltage cycles, $N_{off}$, as determined by the burst mode controller 224, before beginning a burst period of one AC grid voltage cycle. During the burst period, the burst mode controller 224 causes the DC voltage controller 210 to drive the DC-AC inverter 208 such that the burst current $I_B$ is generated in accordance with the energy that has been stored in the storage capacitor 220 during the previous energy storage period. As a result, the inverter output current during a burst period, $I_B$, is greater than the inverter output current during continuous mode, $I_{req}$, for a given level of solar irradiance and temperature. In some embodiments, $I_B = I_{req} * (N_{off} + 1)$.

Due to the charging and discharging of the storage capacitor 220 during burst mode, a ripple voltage ("burst mode ripple voltage", or $V_r$) overrides the average voltage across the storage capacitor 220, and results in a corresponding burst mode ripple voltage overriding the PV module DC voltage, $V_{DC}$. As such, the PV module operating voltage fluctuates in accordance with the magnitude of the burst mode ripple voltage $V_r$; the greater the burst mode ripple voltage $V_r$, the greater the PV module operating voltage excursion. Such a fluctuation in the PV module operating voltage results in reduced efficiency of the inverter 102. For example, when operating proximate the MPP voltage, a larger voltage fluctuation around the MPP voltage results in a greater period of time that the PV module 104 is operating off of the MPP voltage, resulting in less than optimal power being drawn from the PV module 104.

The magnitude of the burst mode ripple voltage $V_r$ varies in accordance with the length of time the storage capacitor 220 charges and discharges; i.e., with the energy storage and burst periods. The burst mode controller 224 controls the energy storage period, i.e., the number of AC grid voltage cycles of the energy storage period, $N_{off}$, such that the burst mode ripple voltage $V_r$ remains below a pre-determined threshold, thereby improving the efficiency of the inverter 102 during burst mode operation.

According to other embodiments of the present invention, half cycle bursts are produced by the DC-AC inverter 208, driven by the DC voltage controller 210, whereas in previous embodiments, full cycle bursts are produced by the inverter 208. In one embodiment where half-cycle bursts are produced by the DC-AC inverter 208, the inverter 102 remains in an energy storage period where a capacitor stores the energy for a number of AC grid voltage cycles, where the number of AC grid voltage cycles, $N_{off}$, is determined as previously described, and then halved and rounded up to the nearest integer.

For example, if $N_{off}$ was initially 1 or 2, then the new $N_{off}$ will be equal to 1, but if $N_{off}$ is equal to 3 or 4, the new $N_{off}$ will be equal to 2. Generally, where the original $N_{off}$ is equal to n, the new $N_{off}$ will be equal to n/2 rounded up to the nearest integer. In this embodiment, $I_B = I_{req} * (2*(\text{new } N_{off}) + 1)$. According to this embodiment, since $N_{off}$ is an integer and ½ cycles are produced, the polarity of the cycles will automatically alternate. The polarity of cycles alternate to give balance in a particular unit (i.e., inverter 102), or allows for monitoring in the gateway 110 to control balance across all PV modules of the array, in which case the gateway directs each PV unit (i.e., each inverter 102) to choose a particular polarity. According to this embodiment, harvest is increased by reducing ripple voltage produced by the $I_{CAP}$ 220.

In another embodiment where half-cycle bursts are produced by the DC-AC inverter 208, the inverter 102 remains in an energy storage period for $N_{off}$ number of AC grid voltage cycles, where $N_{off}$ is determined as previously described when full-cycle bursts are generated, but $I_{req}$ is increased to run at a higher efficiency. According to this embodiment, $Ib = I_{req} * (2*n+1)$, where n is the number of cycles $N_{off}$.

According to some embodiments, the strategy which harvests the maximum amount of energy will be selected by the controller 112 of the gateway 110, or the burst mode controller 224. In yet another embodiment, the inverters follow a dual stage structure and the capacitor is between the first and second stages, i.e. between a first conversion stage such as a DC to DC conversion, and the output stage, or the DC to AC conversion. The same logic applies where the burst mode is driven by the allowable ripple on the capacitor.

When operating in continuous mode, the inverter 102 continually generates output power in-phase with the AC grid power (i.e., during each AC grid voltage cycle). As such, the inverter output power oscillates between zero output power at the AC grid voltage zero-crossings and peak output power at the AC grid voltage peak positive and negative amplitudes. When the inverter output power is set at zero, current from the PV module 104 is precluded from flowing to the DC-AC inverter 208 and therefore charges the storage capacitor 220. When the inverter output power is set at peak, energy stored in the storage capacitor 220 is utilized, in addition to the instantaneous power from the PV module 104, to generate a peak inverter output power of twice the average PV module output power. Thus, the charging and discharging of the storage capacitor 220 during continuous mode provides an AC component overriding the average power provided by the PV module 104.

During both the continuous and burst modes of operation, the ripple voltage caused by the charging and discharging of the storage capacitor 220 provides an opportunity for maximum power point tracking. As the ripple voltage across the PV module 104 varies above and below an average (i.e., DC) PV module voltage, the PV module output power varies in accordance with the ripple voltage. If the PV module 104 produces more power when operating above its DC voltage than when operating below its DC voltage, then the PV module DC voltage is below the MPP and must be increased to reach the MPP. If the PV module 104 produces more power when operating below its DC voltage than when operating above its DC voltage, then the PV module DC voltage is above the MPP and must be decreased to reach the MPP. Thus, the difference between the average power produced by the PV module 104 when it is operating above its DC voltage and when it is operating below its DC voltage indicates in which direction the PV module DC voltage must be shifted to achieve the MPP. Additionally, if the difference is zero, the PV module 104 is biased at the MPP. In some embodiments, such a power difference may be determined based on the PV module output power during certain phases of the AC grid voltage, as further described below.

Figure 3:
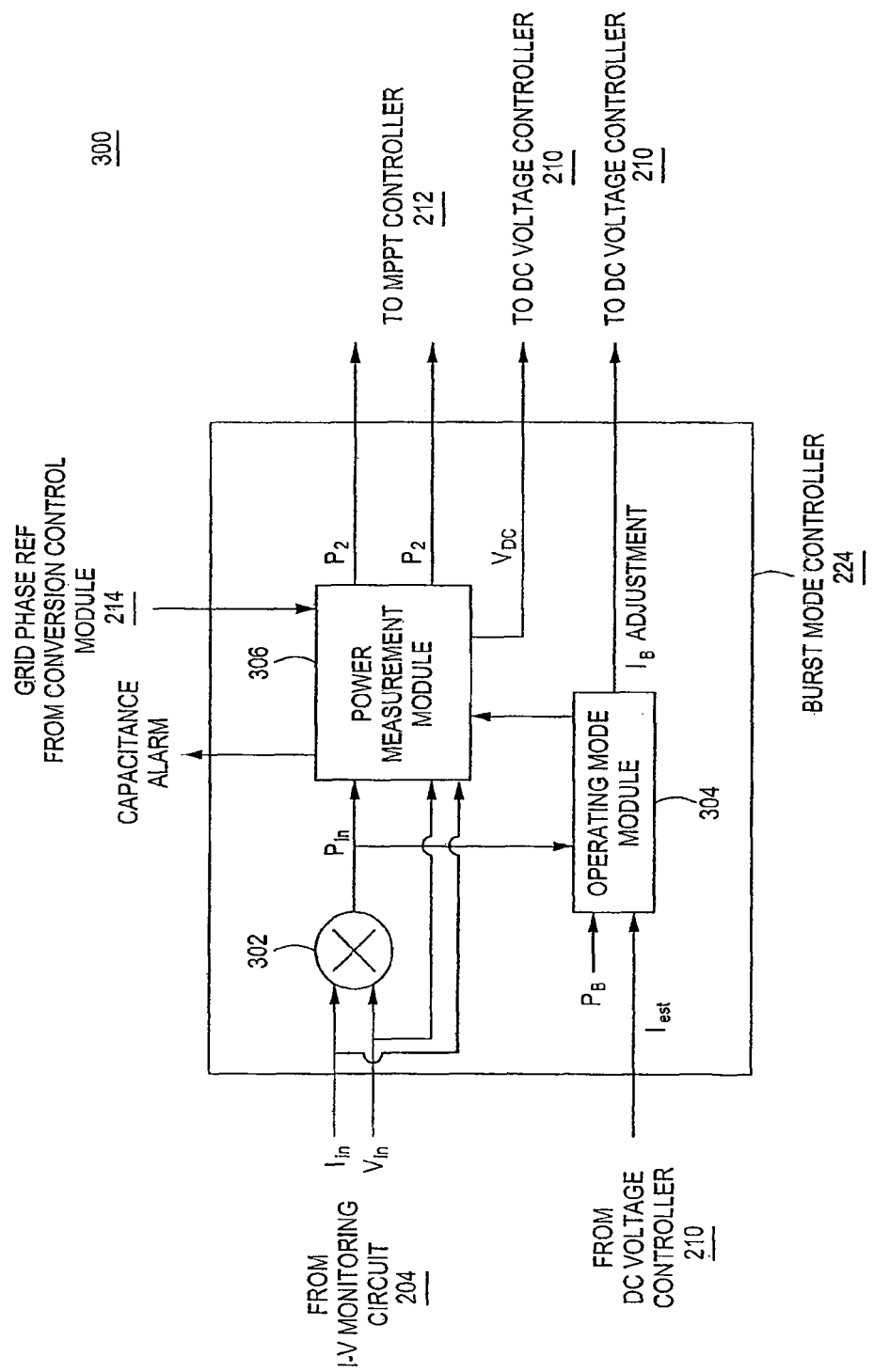
FIG. 3 is a block diagram of a burst mode controller in accordance with one or more embodiments of the present invention.

FIG. 3 is a block diagram 300 of a burst mode controller 224 in accordance with one or more embodiments of the present invention. The burst mode controller 224 comprises a multiplier 302, an operating mode module 304, and a power measurement module 306.

The multiplier 302 receives signals indicative of the instantaneous input current and voltage from the PV module 104, $I_{in}$ and $V_{in}$, respectively, through the I-V monitoring circuit 204, and generates an output signal indicative of the instantaneous input power from PV module 104, $P_{in}$. The output of the multiplier 302 is coupled to the power measurement module 306 and to the operating mode module 304; additionally, the power measurement module 306 receives inputs of $I_{in}$ and $V_{in}$. The operating mode module 304 is further coupled to the DC voltage controller 210, and receives a signal indicative of an estimated PV module input current, $I_{est}$, from the DC voltage controller 210. The $I_{est}$ is an estimated input current to be drawn from the PV module 104 that will result in biasing the PV module 104 at a desired DC voltage setpoint. The operating mode module 304 is also coupled to the power measurement module 306, and additionally receives an input signal of a burst mode power threshold, $P_B$.

The operating mode module 304 compares the PV module input power $P_{in}$ to the burst mode threshold $P_B$. If the inverter 102 is operating in continuous mode and $P_{in}$ is less that $P_B$, the operating mode module 304 switches the inverter 102 to burst mode; once $P_{in}$ is greater than $P_B$, the operating mode module 304 switches the inverter 102 back to continuous mode.

The power measurement module 306 receives an input indicative of the AC grid voltage phase from the conversion control module 214, for example, from a phase lock loop of the conversion control module 214. The power measurement module 306 integrates the PV module input power $P_{in}$ during certain portions of the AC grid voltage cycle to obtain a first power "bin", $PB_1$, and a second power "bin", $PB_2$. Additionally, the PV module input voltage $V_{in}$ is integrated over a portion of the AC grid voltage cycle to obtain a DC voltage bin, $V_{DC}B$, where $V_{DC}B$ is utilized to determine a DC (i.e., average) PV module input voltage, $V_{DC}$. In some embodiments, during each cycle of the AC grid voltage when operating in continuous mode, the power measurement module 306 integrates $P_{in}$ during a 90°-180° phase of the AC grid voltage cycle to obtain $PB_1$, and integrates $P_{in}$ during a 180°-270° phase of the same AC grid voltage cycle to obtain $PB_2$. The PV module input voltage $V_{in}$ is integrated over the entire 90°-270° phase to obtain $V_{DC}B$. During burst mode, the power bins and the average PV module input voltage are determined as described further below.

The power measurement module 306 determines a first and a second power measurement, $P_1$ and $P_2$, respectively, based on $PB_1$ and $PB_2$. During continuous mode, $P_1=PB_1$, and $P_2=PB_2$; during burst mode, the power measurements are determined as described further below. The first and second power measurements are supplied to the MPPT controller 212 for determining whether the PV module 104 is operating at, above, or below the MPP, and any required shift in the DC voltage setpoint to achieve the MPP. Additionally, the power measurement module 306 determines a PV module DC voltage, $V_{DC}$, based on $V_{DC}B$. The power measurement module 306 supplies $V_{DC}$ to the DC voltage controller 210 for determining $I_{req}$. The new DC voltage setpoint and the required output current $I_{req}$ are applied during the next AC grid voltage cycle.

When switching from continuous to burst mode, the operating mode module 304 determines a maximum number of AC grid voltage cycles, $N_{off}$, for an energy storage period such that the burst mode ripple voltage $V_r$ will remain below a pre-determined threshold. In some embodiments, a threshold of 10% of the PV module DC voltage $V_{DC}$ is utilized. In some embodiments, $N_{off}$ is computed as follows:

$$Noff < C*Vdc*Vr/Pin*T$$

In the above equation, C is the capacitance of the storage capacitor 220, $V_{DC}$ is the PV module DC voltage, $V_r$ is the burst mode ripple voltage, $P_{in}$ is the input power from the PV module 104, and T is the AC grid voltage cycle period.

During burst mode, the power measurement module 306 integrates the PV module input power $P_{in}$ over certain portions of the AC grid voltage cycle during an energy storage period to obtain $PB_1$ and $PB_2$. To determine the portions of the AC grid voltage cycle over which to integrate $P_{in}$, the $N_{off}$ AC grid cycles of the energy storage period are partitioned into two equal portions—a "first half" of the energy storage period and a "second half" of the energy storage period, where the first half occurs prior to the second half. For example, for an energy storage period of one AC grid voltage cycle, the first half comprises the AC grid voltage cycle from 0°-180°, and the second half comprises the same AC grid voltage cycle from 180°-360°. For an energy storage period of two AC grid voltage cycles, the first half comprises the entire first AC grid voltage cycle, and the second half comprises the entire second AC grid voltage cycle. For energy storage periods greater than two AC grid voltage cycles, the first and second halves are analogously defined.

To obtain $PB_1$, the power measurement module 306 integrates the PV module input power $P_{in}$ during any of the 90°-270° AC grid voltage phase periods occurring within the first half of the energy storage period. To obtain $PB_2$, the power measurement module 306 integrates the PV module input power $P_{in}$ during any of the 90°-270° AC grid voltage phase periods occurring within the second half of the energy storage period. Additionally, the power measurement module 306 integrates the PV module input voltage $V_{in}$ over each 90°-270° phase during the entire energy storage period, along with the 90°-270° phase during the subsequent burst period, to obtain $V_{DC}B$.

The measured power bins $PB_1$ and $PB_2$ are then used by the power measurement module 306 to determine the first and second power measurements, $P_1$ and $P_2$, respectively. In some embodiments, $P_1=PB_1/N_{off}$ and $P_2=PB_2/N_{off}$ during burst mode. Additionally, the power measurement module 306 determines $V_{DC}$ based on $V_{DC}B$. The first and second power measurements $P_1$ and $P_2$ are supplied to the MPPT controller 212 and $V_{DC}$ is supplied to the DC voltage controller 210 for the appropriate MPPT and inverter output current processing. The output of such processing, i.e., the new DC voltage setpoint and the required output current from the inverter 102, are applied to the burst period following the next energy storage period.

In some instances, the storage capacitor 220 may degrade over time and degrade the performance of the inverter 102. In order to identify such a condition, the operation of the storage capacitor 220 may be evaluated during burst mode when the number of AC grid voltage cycles in the energy storage period (i.e., $N_{off}$) is two or more. In some embodiments, the power measurement module 306 determines a difference between the average input voltage $V_{in}$ from the PV module 104 during the first and second AC grid voltage cycles of the energy storage period (i.e., $\Delta V$). The capacitance C of the storage capacitor 220 can then be estimated as follows:

$$C = Iin/Fgrid*\Delta V$$

Where $I_{in}$ is the input current from the PV module 104, and $F_{grid}$ is the frequency of the grid voltage. If the capacitance is below a capacitance threshold, the power measurement module 306 may provide an output alarm to indicate the condition.

Figure 4:
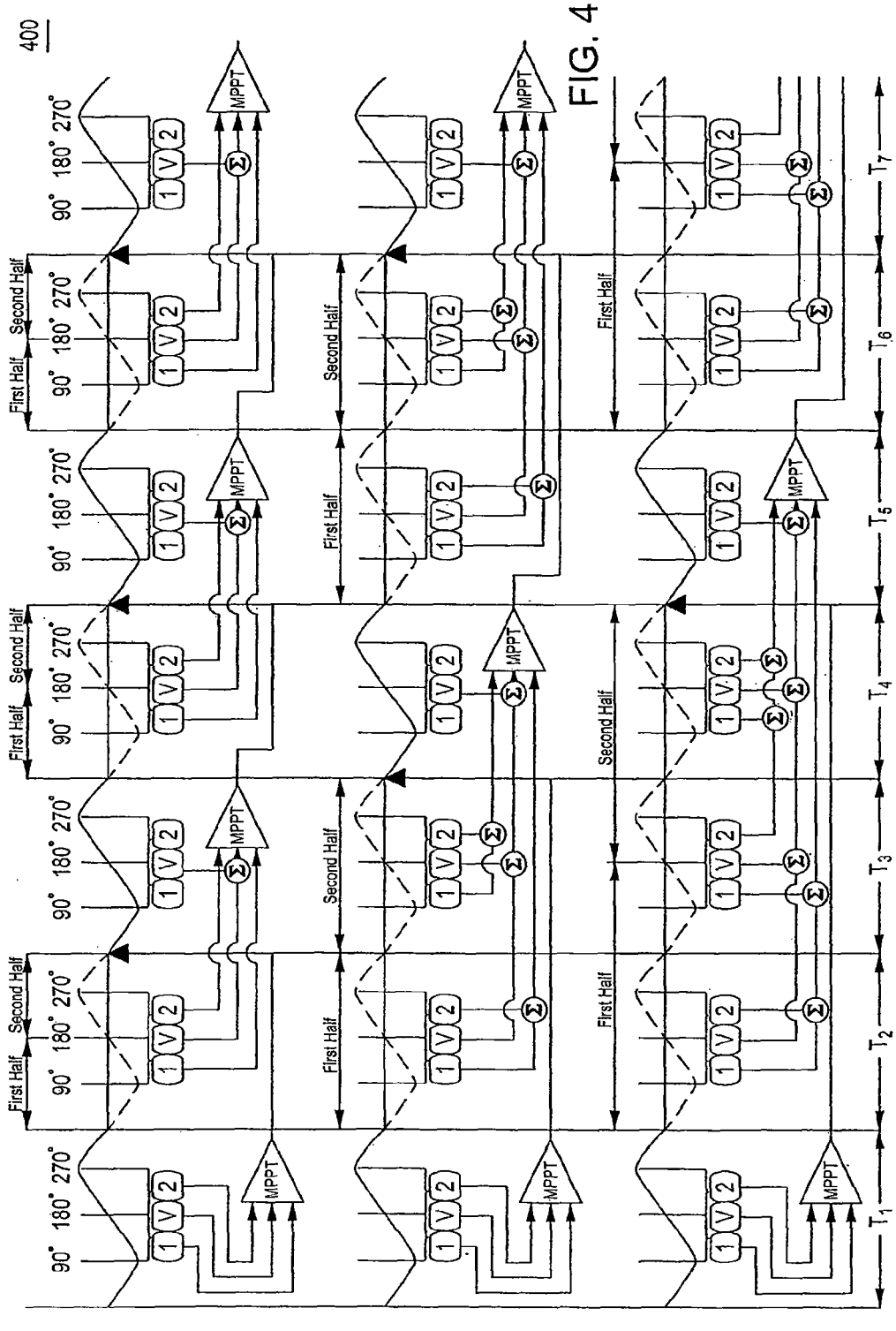
FIG. 4 is a plurality of waveforms depicting collection periods of PV module power and voltage measurements during burst mode in accordance with one or more embodiments of the present invention.

FIG. 4 is a plurality of waveforms 400 depicting collection periods of PV module power and voltage measurements during burst mode in accordance with one or more embodiments of the present invention.

The waveform 402 corresponds to a computed energy storage period of one AC grid voltage cycle. During a first AC grid voltage cycle $T_1$, an inverter is operating in continuous mode. The power bins $PB_1$ and $PB_2$ are obtained by integrating the PV module input power $P_{in}$ during the 90°-180° and 180°-270° phases of the AC grid voltage, respectively, and the PV module input voltage $V_{in}$ is integrated during the entire 90°-270° period to obtain the DC voltage bin $V_{DC}B$. $P_1$ is set to $PB_1$, $P_2$ is set to $PB_2$, and the average DC voltage $V_{DC}$ is computed from $V_{DC}B$. The power and voltage measurements $PB_1$, $PB_2$, and $V_{DC}$ are utilized to determine the inverter operating parameters for the next AC grid voltage cycle in which the inverter generates output power.

At the end of $T_1$, the inverter switches to burst mode and enters an energy storage period. The inverter generates no output power during such a period. The power bin $PB_1$ is obtained by integrating the PV module input power $P_{in}$ during the 90°-270° phase within the first half of the energy storage period (i.e., the 90°-180°phase of $T_2$), and the power bin $PB_2$ is obtained by integrating the PV module input power $P_{in}$ during the 90°-270° phase within the second half of the energy storage period (i.e., the 180°-270° phase of $T_2$). Additionally, the PV module input voltage $V_{in}$ is integrated during the entire 90°-270° period of $T_2$ and to obtain the voltage bin $V_{DC}B$.

At $T_3$, the inverter begins a burst period and begins generating output power. The operating parameters determined during $T_1$ are adjusted accordingly to drive the inverter to generate the burst mode current, $I_B$. During $T_3$, the PV module input voltage $V_{in}$ is integrated during the entire 90°-270° period of $T_3$ and added to the voltage bin $V_{DC}B$. $P_1$ is set to $PB_1$, and $P_2$ is set to $PB_2$, and $V_{DC}$ is computed from $V_{DC}B$. The power and voltage measurements $P_1$, $P_2$, and $V_{DC}$ are utilized to determine the inverter operating parameters for the next AC grid voltage cycle in which the inverter generates output power.

At $T_4$, the inverter begins an energy storage period. Analogous to the operation during $T_2$, $PB_1$, $PB_2$, and $V_{DC}B$ are obtained. At time $T_5$, the inverter begins a burst period. The operating parameters determined during $T_3$ are adjusted accordingly to drive the inverter to generate the burst mode current, $I_B$. Analogous to the operation during $T_3$, the PV module input voltage $V_{in}$ is integrated during the entire 90°-270° period of $T_5$ and added to the voltage bin $V_{DC}B$. $P_1$ is set to $PB_1$, and $P_2$ is set to $PB_2$, and $V_{DC}$ is computed from $V_{DC}B$. The power and voltage measurements $P_1$, $P_2$, and $V_{DC}$ are utilized to determine the inverter operating parameters for the next AC grid voltage cycle in which the inverter generates output power.

The waveform 404 corresponds to a computed energy storage period of two AC grid voltage cycles. During a first AC grid voltage cycle $T_1$, an inverter is operating in continuous mode. The power bins $PB_1$ and $PB_2$ are obtained by integrating the PV module input power $P_{in}$ during the 90°-180° and 180°-270° phases of the AC grid voltage, respectively, and the PV module input voltage $V_{in}$ is integrated during the entire 90°-270° period to obtain the DC voltage bin $V_{DC}B$. $P_1$ is set to $PB_1$, $P_2$ is set to $PB_2$, and the average DC voltage $V_{DC}$ is computed from $V_{DC}B$. The power and voltage measurements $P_1$, $P_2$, and $V_{DC}$ are utilized to determine the inverter operating parameters for the next AC grid voltage cycle in which the inverter generates output power.

At $T_2$, the inverter switches to burst mode and enters an energy storage period of two AC grid voltage cycles. The inverter generates no output power during such a period. The power bin $PB_1$ is obtained by integrating $P_{in}$ during the portions of the 90°-270° phases occurring within the first half of the energy storage period (i.e., the 90°-270° phase of $T_2$), and the power bin $PB_2$ is obtained by integrating $P_{in}$ during portions of the 90°-270° phases occurring within the second half of the energy storage period (i.e., the 90°-270° phase of $T_3$). Additionally, the PV module input voltage $V_{in}$ is integrated during each 90°-270° period of the energy storage period, i.e., the 90°-270° phase periods of $T_2$ and $T_3$ to obtain the voltage bin $V_{DC}B$.

At $T_4$, the inverter begins a burst period and begins generating output power. The operating parameters determined during $T_1$ are adjusted accordingly to drive the inverter to generate the burst mode current, $I_B$. During $T_4$, the PV module input voltage $V_{in}$ is integrated during the entire 90°-270° period of $T_4$ and added to the voltage bin $V_{DC}B$. $P_1$ is set to $PB_1/2$, $P_2$ is set to $PB_2/2$, and $V_{DC}$ is computed from $V_{DC}B$. The power and voltage measurements $P_1$, $P_2$, and $V_{DC}$ are utilized to determine the inverter operating parameters for the next AC grid voltage cycle in which the inverter generates output power.

At $T_5$, the inverter begins an energy storage period. Analogous to the operation during $T_2$ and $T_3$, $PB_1$, $PB_2$, and $V_{DC}B$ are obtained. At time $T_7$, the inverter begins a burst period. The operating parameters determined during $T_4$ are adjusted accordingly to drive the inverter to generate the burst mode current, $I_B$. Analogous to the operation during $T_2$ and $T_3$, the PV module input voltage $V_{in}$ is integrated during the entire 90°-270° period of $T_7$ and added to the voltage bin $V_{DC}B$. $P_1$ is set to $PB_1/2$, $P_2$ is set to $PB_2/2$, and $V_{DC}$ is computed from $V_{DC}B$. The power and voltage measurements $P_1$, $P_2$, and $V_{DC}$ are utilized to determine the inverter operating parameters for the next AC grid voltage cycle in which the inverter generates output power.

The waveform 406 corresponds to a computed energy storage period of three AC grid voltage cycles. During a first AC grid voltage cycle $T_1$, an inverter is operating in continuous mode. The power bins $PB_1$ and $PB_2$ are obtained by integrating the PV module input power $P_{in}$ during the 90°-180° and 180°-270° phases of the AC grid voltage, respectively, and the PV module input voltage $V_{in}$ is integrated during the entire 90°-270° period to obtain the DC voltage bin $V_{DC}B$. $P_1$ is set to $PB_1$, $P_2$ is set to $PB_2$, and the average DC voltage $V_{DC}$ is computed from $V_{DC}B$. The power and voltage measurements $P_1$, $P_2$, and $V_{DC}$ are utilized to determine the inverter operating parameters for the next AC grid voltage cycle in which the inverter generates output power.

At $T_2$, the inverter switches to burst mode and enters an energy storage period of three AC grid voltage cycles. The inverter generates no output power during such a period. The power bin $PB_1$ is obtained by integrating $P_{in}$ during the portions of the 90°-270° phases occurring within the first half of the energy storage period (i.e., the 90°-270° phase of $T_2$ and the 90°-180° phase of $T_3$), and the power bin $PB_2$ is obtained by integrating $P_{in}$ during portions of the 90°-270° phases occurring within the second half of the energy storage period (i.e., the 180°-270° phase of $T_3$ and the 90°-270° phase of $T_4$). Additionally, the PV module input voltage $V_{in}$ is integrated during each 90°-270° period of the energy storage period, i.e., the 90°-270° phase periods of $T_2$, $T_3$, and $T_4$ to obtain the voltage bin $V_{DC}B$.

At $T_5$, the inverter begins a burst period and begins generating output power. The operating parameters determined during $T_1$ are adjusted accordingly to drive the inverter to generate the burst mode current, $I_B$. During $T_5$, the PV module input voltage $V_{in}$ is integrated during the entire 90°-270° phase and added to the voltage bin $V_{DC}B$. $P_1$ is set to $PB_1/3$, $P_2$ is set to $PB_2/3$, and $V_{DC}$ is computed from $V_{DC}B$. The power and voltage measurements $P_1$, $P_2$, and $V_{DC}$ are utilized to determine the inverter operating parameters for the next AC grid voltage cycle in which the inverter generates output power.

Figure 5:
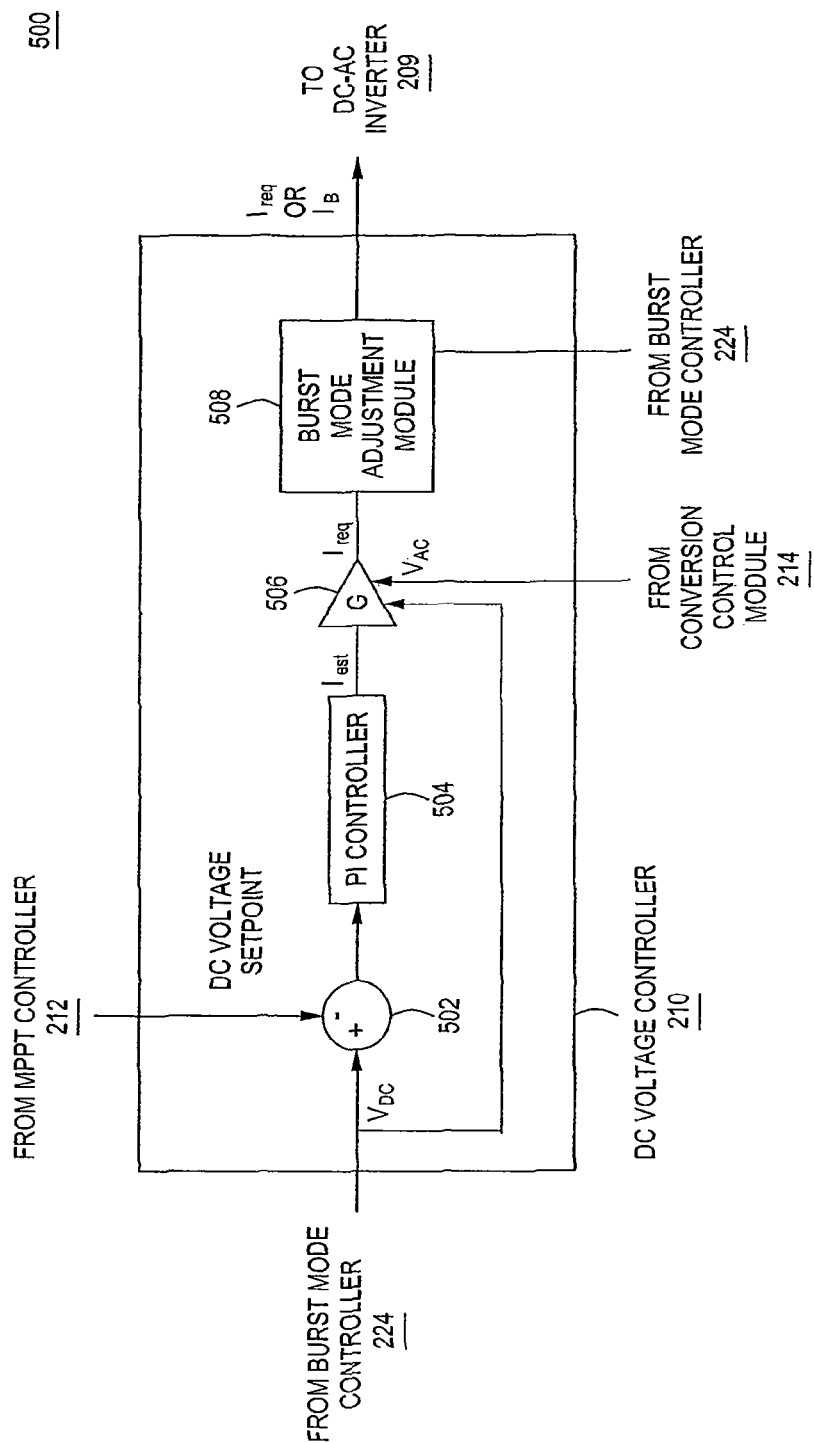
FIG. 5 is a block diagram of a DC voltage controller in accordance with one or more embodiments of the present invention.

FIG. 5 is a block diagram 500 of a DC voltage controller 210 in accordance with one or more embodiments of the present invention. The DC voltage controller 210 comprises an adder/subtractor 502, a proportional-integral (PI) controller 504, a gain module 506, and a burst mode adjustment module 508. The DC voltage controller 210 utilizes the first feedback loop 216 to control the current supplied to the DC-AC inverter 208 such that the PV module 104 is biased at the DC voltage setpoint.

The adder/subtractor 502 receives a signal indicative of the PV module DC voltage, $V_{DC}$, from the burst mode controller 224, and a signal indicative of the DC voltage setpoint from the MPPT controller 212. The output of the adder/subtractor 502 couples a difference between $V_{DC}$ and the DC voltage setpoint to the PI controller 504. The PI controller 504 acts to correct the difference by estimating an input current, $I_{est}$, to be drawn from the PV module 104 that will result in biasing the PV module 104 at the DC voltage setpoint.

The output of the PI controller 504 is coupled to the gain module 506 and provides a signal indicative of $I_{est}$ to the gain module 506. The gain module 506 further receives an input of the AC grid voltage amplitude, $V_{AC}$, from the conversion control module 214, and $V_{DC}$ from the burst mode controller 224, and determines the required output current from the inverter, $I_{req}$, to draw $I_{est}$ from the PV module 104. In some embodiments, $I_{req}$ is calculated as follows:

$$I_{req}=V_{DC}*I_{est}/V_{AC}*\text{eff}$$

In the above equation, eff is an efficiency rating of the inverter.

The output of the gain module 506 is coupled to the burst mode adjustment module 508. The burst mode adjustment module 508 adjusts the required inverter output current $I_{req}$ during burst mode such that it corresponds to the burst mode output current, $I_B$, in accordance with a control signal received from the burst mode controller 224. The output of the burst mode adjustment module 508 is coupled to the DC-AC inverter 208 and drives the DC-AC to generate an output current $I_{req}$ during continuous mode and an output current $I_B$ during burst mode.

Figure 6:
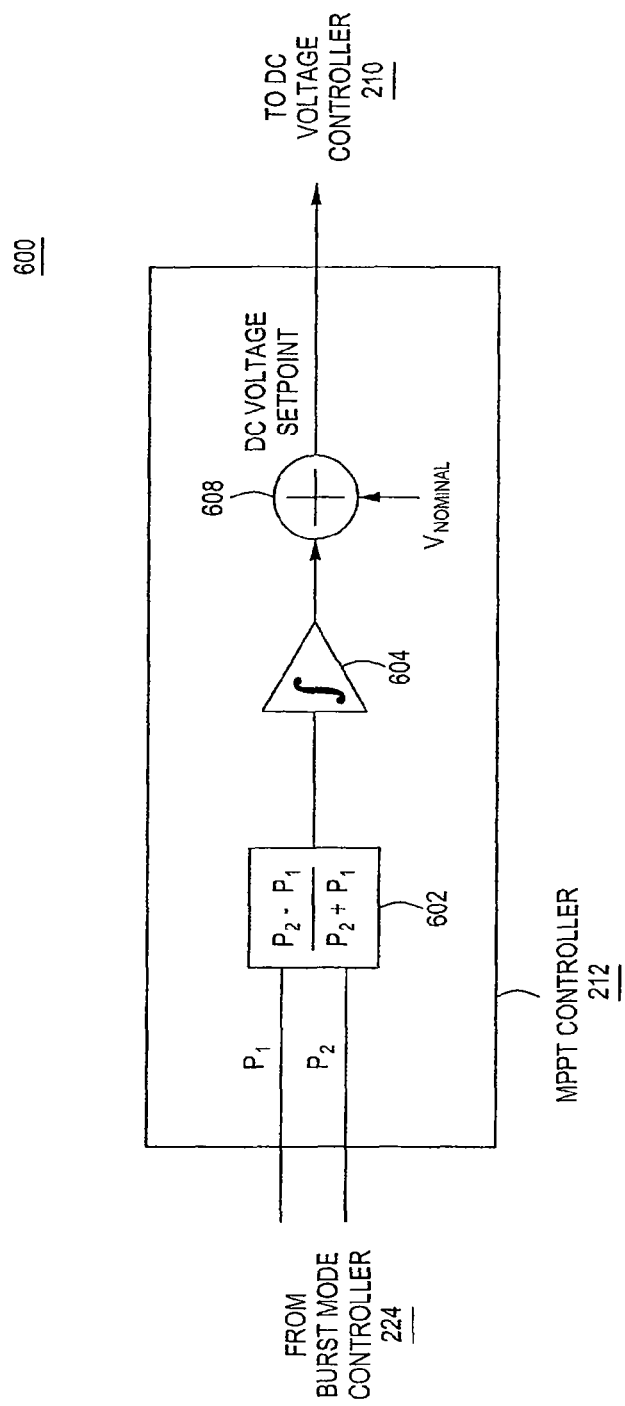
FIG. 6 is a block diagram of an MPPT controller in accordance with one or more embodiments of the present invention.

FIG. 6 is a block diagram 600 of an MPPT controller 212 in accordance with one or more embodiments of the present invention. The MPPT controller 212 comprises a power difference module 602, an integrator 604, and an adder 608. The MPPT controller 212 utilizes the second feedback loop 218 to determine a DC voltage setpoint for the PV module 104 corresponding to the MPP voltage.

The power difference module 602 receives signals indicative of the first and second power measurements, $P_1$ and $P_2$, from the burst mode controller 224. The power difference module 602 computes a power difference between $P_1$ and $P_2$ and utilizes the power difference to determine an error signal, $\varepsilon$. In some embodiments, the power difference is computed as $(P_2-P_1)/(P_2+P_1)$.

The error signals from the power difference module 602 is coupled to the integrator 604. The integrator 604 integrates the error signal $\varepsilon$ and couples the integrated error signal to the adder 608. The adder 608 additionally receives an input of a nominal voltage, $V_{nom}$, where $V_{nom}$ is an initial estimate of the MPP voltage. The integrated error signal acts to "fine tune" the nominal voltage such that the DC voltage setpoint (i.e., the sum of the integrated error and the nominal voltage) corresponds to the MPP voltage. The DC voltage setpoint is then supplied to the DC voltage controller 210 in order to drive the PV module 104 to operate at the DC voltage setpoint.

Figure 7:
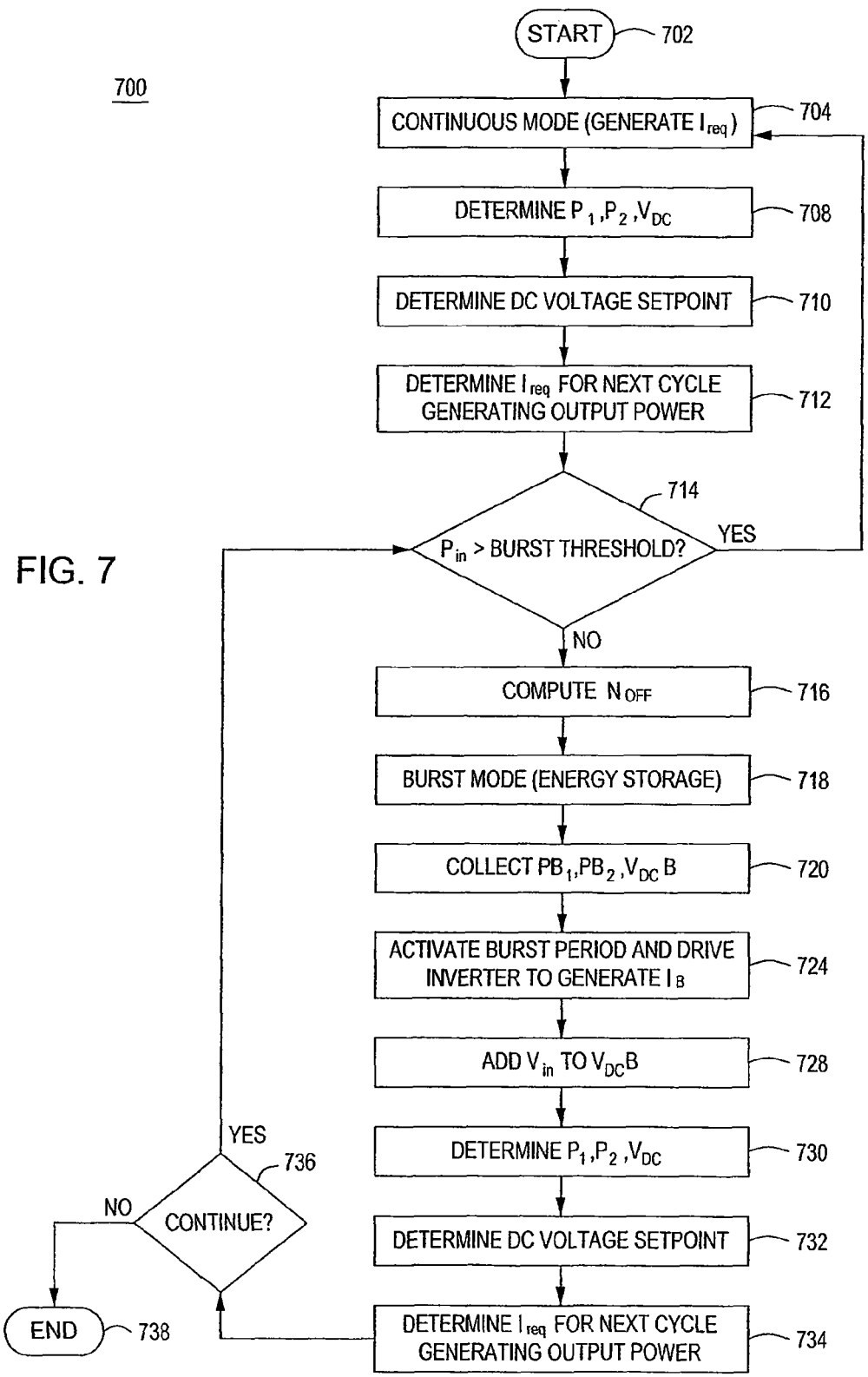
FIG. 7 is a flow diagram of a method for operating an inverter in burst mode in accordance with one or more embodiments of the present invention.

FIG. 7 is a flow diagram of a method 700 for operating an inverter in burst mode in accordance with one or more embodiments of the present invention. In some embodiments, such as the embodiment described below, a power conversion device, such as a DC-AC inverter, is coupled to the PV module and converts DC power from the PV module to AC power, where such AC power is coupled to a commercial power grid. In some embodiments, multiple PV modules may be coupled to a single centralized DC-AC inverter; alternatively, individual PV modules may be coupled to individual DC-AC inverters (e.g., one PV module per DC-AC inverter). In some embodiments, a DC-DC converter may be coupled between the PV module or PV modules and the DC-AC inverter.

The method 700 begins at step 702 and proceeds to step 704. At step 704, the inverter operates in continuous mode and generates an output current, $I_{req}$, such that the PV module is biased proximate the MPP voltage. At step 708, a first and a second power measurement of the input power from the PV module, $P_1$ and $P_2$, respectively, are obtained. In some embodiments, the first power measurement comprises integrating the input power $P_{in}$ from the PV module during a 90°-180° phase of an AC grid waveform cycle to obtain a first "power bin", $PB_1$, where $P_1=PB_1$, and the second power measurement comprises integrating $P_{in}$ during the 180°-270° phase of the same AC grid waveform cycle to obtain a second "power bin", $PB_2$, where $P_2=PB_2$. In some embodiments, $P_{in}$ may be sampled during such phases to obtain the first and second power measurements; for example, $P_{in}$ may be sampled at a rate of 256 times the commercial power grid frequency. In alternative embodiments, the first and second power measurements may be obtained during different phases of an AC grid waveform cycle.

Additionally, an average, or DC, voltage from the PV module, $V_{DC}$, is computed. In some embodiments, the voltage $V_{in}$ from the PV module is integrated during the 90°-270° phase of the AC grid voltage to obtain a DC voltage "bin", $V_{DC}B$. $V_{DC}$ is then computed based on $V_{DC}B$.

The method 700 proceeds to step 710, where $P_1$, $P_2$ and $V_{DC}$ are utilized to determine a DC voltage setpoint for the PV module such that the DC voltage setpoint corresponds to the MPP voltage. At step 712, a required inverter output current, $I_{req}$, that will result in the PV module being biased at the desired DC voltage setpoint is determined. Steps 704 through 712 of the method 700 comprise an outer feedback loop that determines whether the PV module is currently biased at the MPP voltage, and, if necessary, adjusts the DC voltage setpoint to achieve the MPP.

The method 700 proceeds to step 714, where a determination is made whether the PV module input power exceeds a burst mode threshold. If the condition at step 714 is met, the method 700 returns to step 704 and the inverter continues to operate in continuous mode. If the condition at step 714 is not met, the method 700 proceeds to step 716.

At step 716, a maximum number of AC grid voltage cycles, $N_{off}$, for energy storage periods is determined based on a burst mode ripple voltage threshold. In some embodiments, a burst mode ripple voltage threshold of 10% of the PV module DC voltage $V_{DC}$ is utilized. At step 718, the inverter switches to burst mode, and begins an energy storage period of $N_{off}$ AC voltage grid cycles. During the energy storage period, the inverter does not produce any output power, and power generated by the PV module is stored in the inverter.

At step 720, the first and second power bins, $PB_1$ and $PB_2$, are collected, along with the DC voltage bin, $V_{DC}B$. In some embodiments, the $N_{off}$ AC grid cycles are partitioned into two equal portions—a "first half" of the $N_{off}$ AC voltage grid cycles and a "second half" of the $N_{off}$ AC voltage grid cycles, where the first half occurs prior to the second half. $PB_1$ is obtained by integrating the PV module input power $P_{in}$ during any of the 90°-270° AC grid voltage phase periods occurring within the first half, and $PB_2$ is obtained by integrating the PV module input power $P_{in}$ during any of the 90°-270° AC grid voltage phase periods occurring within the second half. Additionally, the PV module input voltage $V_{in}$ over each 90°-270° phase during the energy storage period to obtain $V_{DC}B$.

The method 700 proceeds to step 724. At step 724, following the energy storage period, a burst period is activated and the inverter begins to generate output power. In some embodiments, the burst period comprises a single AC grid voltage cycle. During the burst period, the required output current $I_{req}$ determined in step 712 is adjusted such that the inverter generates a burst current, $I_B$, in accordance with the amount of energy stored during the energy storage period. In some embodiments, $I_B=I_{req}*(N_{off}+1)$.

At step 728, an input voltage from the PV module is measured and added to the DC voltage bin $V_{DC}B$; in some embodiments, the PV module input voltage Vin is integrated over the 90°-270° phase of the AC grid voltage cycle and added to $V_{DC}B$. The method proceeds to step 730, where $P_1$, $P_2$, and $V_{DC}$ are determined. In some embodiments, $P_1=PB_1/N_{off}$, $P_2=PB_2/N_{off}$, and $V_{DC}$ is the average of $V_{DC}B$. At step 732, the DC voltage setpoint for the PV module is determined based on $P_1$, $P_2$, and $V_{DC}$. At step 734, the required inverter output current, $I_{req}$, that will result in the PV module being biased at the desired DC voltage setpoint is determined.

The method 700 proceeds to step 736, where a determination is made whether operation of the inverter should continue. If the condition at step 736 is met, the method 700 returns to step 714; if the conditions at step 736 is not met, the method 700 proceeds to step 738 where it ends.

Figure 8:
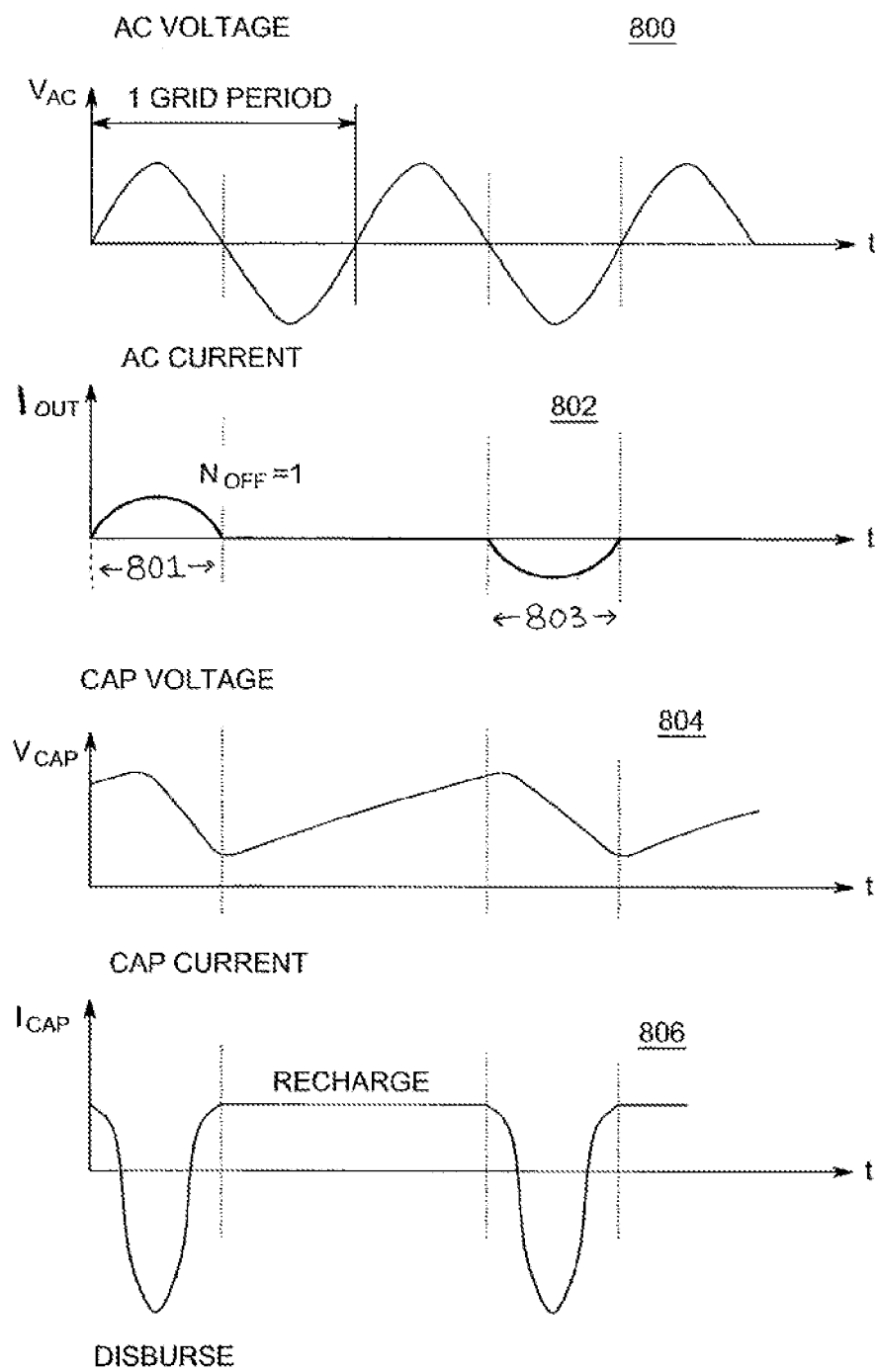
FIG. 8 is an illustration of a timing diagram for $V_{ac}$, the output voltage for the AC-DC inverter going out to the power grid and the storage capacitor charging cycle in accordance with embodiments of the present invention.

FIG. 8 is an illustration of a timing diagram for the grid voltage $V_{ac}$, the output current Iout from the AC-DC inverter going out to the power grid, and the storage capacitor charging cycle in accordance with embodiments of the present invention. The waveform 800 for Vac shows several different stages of the grid voltage. During the first stage, portion 801, a burst of current is being output to the grid as shown in waveform 802. Then, for a period of $N_{off}$ cycles, the capacitor is in storage mode, as shown by the waveforms 804 and 806 depicting capacitor voltage Vcap and capacitor current Icap, and no output current, as shown in waveform 802, is output to the power grid (i.e., no output current is generated during the storage mode). After $N_{off}=1$ cycle, the output may be returned to a full cycle bursting instead of half cycle bursting to produce a full cycle or, as depicted in waveform 802, after the Noff cycle, a ½ cycle burst is produced in portion 803, with an alternate polarity.

According to some embodiments where half-cycle burst mode is used, the power out from a particular inverter is balanced (so the DC value, on average, is 0) by generating equal numbers of positive and negative half-cycle bursts; in other embodiments, the gateway monitors the array and controls the polarity of the half-cycle bursts from the inverters to balance the power output across the array. According to other exemplary embodiments, the current injected into the grid is accumulated in positive ½ voltage cycles and then subtracted during the negative half voltage cycles, making the accumulated current value zero. If the accumulated value is not zero, small corrections are made to the value of the current in the positive direction, or the negative direction, to insure 0 DC current for avoiding saturation of the distribution transformers.

Figure 9:
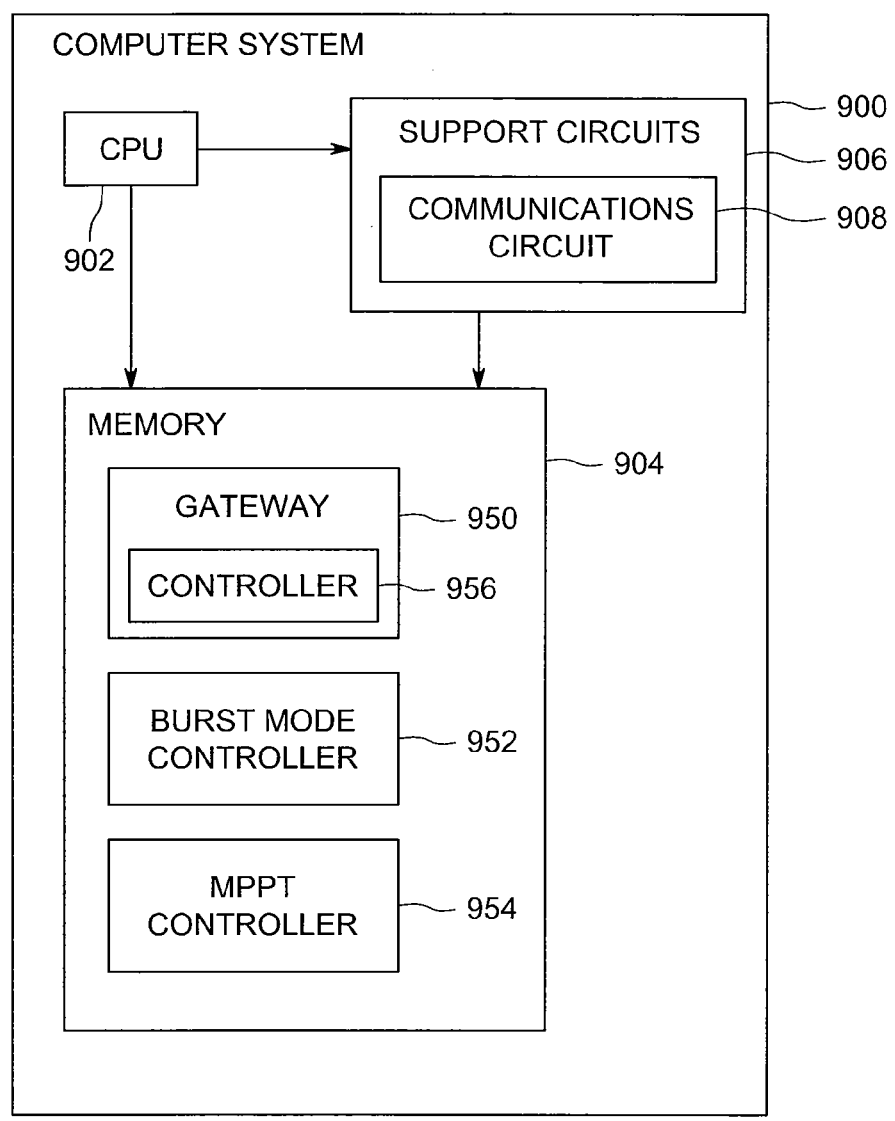
FIG. 9 is a block diagram of a computer system as one embodiment of an exemplary implementation of the PV system shown in FIG. 1.

FIG. 9 is a block diagram of a computer system 900 as one embodiment of an exemplary implantation of the system 100 shown in FIG. 1. The computer system 900 includes a processor 902, a memory 904 and various support circuits 906. The central processing unit (CPU) 902 may include one or more microprocessors known in the art, and/or dedicated function processors such as field programmable gate arrays programmed to perform dedicated processing functions. The support circuits 908 for the processor 902 include microcontrollers, application specific integrated circuits (ASIC), cache, power supplies, clock circuits, data registers, input/output (I/O) interface, and the like.

The memory 904 stores non-transient processor-executable instructions and/or data that may be executed by and/or used by the processor 902. These processor-executable instructions may comprise firmware, software, and the like, or some combination thereof. Modules having processor-executable instructions that are stored in the memory 904 comprise gateway 950, the burst mode controller 952 and the mppt controller 954. The gateway 950 may further comprise the controller 956.

In an exemplary embodiment, the memory 904 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

Figure 10:
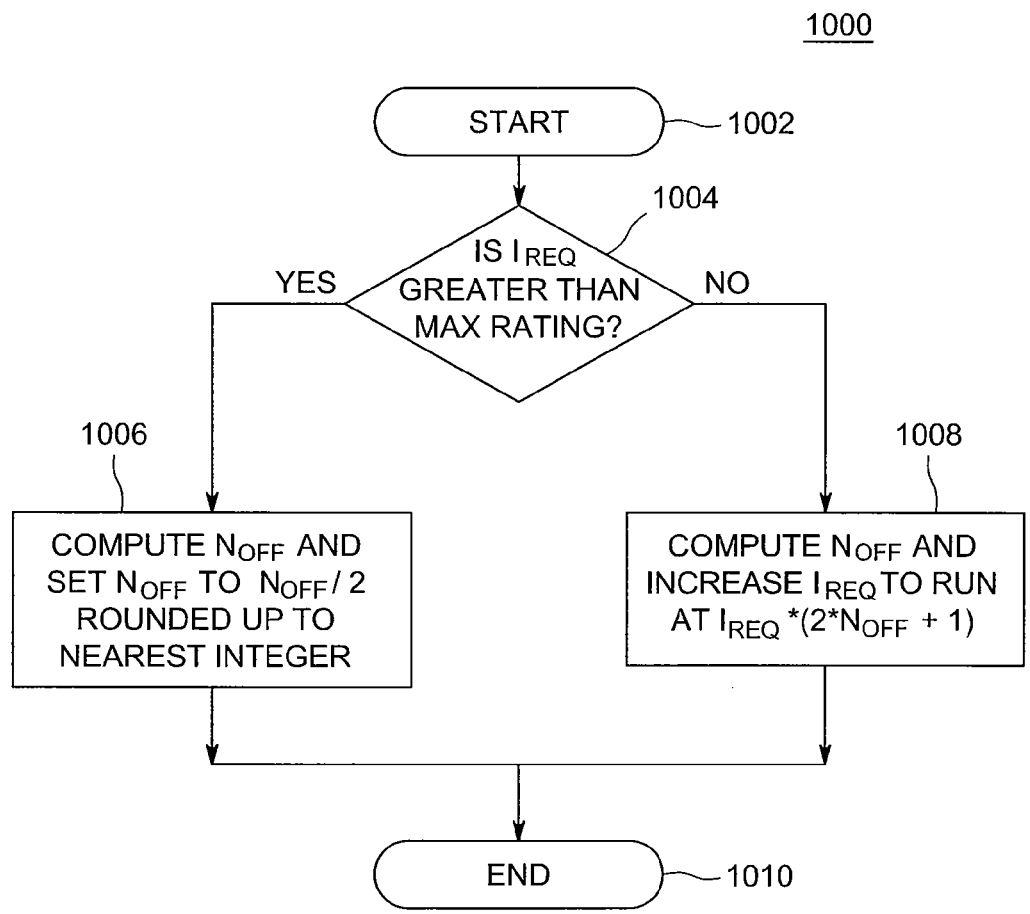
FIG. 10 is a flow diagram of a method for choosing a burst mode according to an exemplary embodiment of the present invention.

FIG. 10 is a flow diagram of a method 1000 for selecting a half-cycle burst method according to exemplary embodiments of the present invention. Method 1000 represents the execution of a portion of the controller 112, implemented as controller 956 stored on memory 904 and executed on the computer system 900.

The method begins at step 1002 and proceeds to step 1004. Prior to using a particular half-cycle method, if it is determined that $I_{req}$ is greater than the maximum rating of the inverter 102 at step 1004, the alternate method, where the new $N_{off}$ will be equal to n/2 rounded up to the nearest integer is selected at step 1006. If $I_{req}$ is not greater than the maximum rating of the inverter 102 at step 1008, then a new $I_{req}$ is calculated as $I_{req}*(2*N_{off}+1)$. The method 1000 then terminates at step 1010.

While the foregoing is directed to embodiments of the present invention, other and further embodiments of the invention may be devised without departing from the basic scope thereof, and the scope thereof is determined by the claims that follow.

The invention claimed is:

1. A method for converting DC input power into AC output power comprising:
   operating a DC-AC inverter in a continuous mode, while the DC input power is at a first level, wherein during the continuous mode the DC input power is continuously converted into AC output power and applied to an AC power grid; and
   upon detecting the DC input power is at a second level, operating the DC-AC inverter in a first burst mode, wherein during the first burst mode a first period of energy storage is immediately followed by a burst of AC output current generated for half of a particular grid cycle and immediately followed by a second period of energy storage, wherein each of the first and the second periods of energy storage lasts an integer number of grid voltage periods during which the DC-AC inverter does not generate any output power.

2. The method of claim 1 wherein each of the first and the second periods of energy storage is for (($N_{off}/2$) rounded up to the nearest integer) AC grid voltage cycles, wherein $N_{off}$ is the number of grid cycles of energy storage for bursting for a full grid-cycle.

3. The method of claim 2 further comprising calculating the current to be generated by the DC-AC inverter during the burst, $I_B$, as $I_{req}*(2*(new\ N_{off})+1)$, wherein new $N_{off}=((N_{off}/2)$ rounded up to the nearest integer), and wherein $I_{req}$ is a required AC output current from the DC-AC inverter.

4. The method of claim 1 further comprising automatically alternating the polarity of subsequent bursts of AC output current following the burst of AC output current.

5. The method of claim 1 further comprising:
   calculating the current to be generated by the DC-AC inverter during a burst when operating in a second burst mode as $I_{req}*(2*N_{off}+1)$; and
   operating the DC-AC inverter in the second burst mode, wherein, when operating in the second burst mode, each energy storage period lasts $N_{off}$ AC grid voltage cycles, wherein $N_{off}$ is the number of grid cycles of energy storage for bursting for a full grid-cycle, and wherein $I_{req}$ is a required AC output current from the DC-AC inverter.

6. The method of claim 5 further comprising:
   selecting the first burst mode if $I_{req}$ is greater than a maximum rating for the DC-AC inverter; and
   selecting the second burst mode if $I_{req}$ is not greater than the maximum rating for the DC-AC inverter.

7. The method of claim 5 further comprising selecting a burst mode from the first or the second burst mode based on the burst mode which harvests a greater amount of energy.

8. An apparatus for converting DC input power into AC output power comprising:
   a DC-AC inverter comprising at least one controller for causing the DC-AC inverter to operate in a continuous mode while the DC input power is at a first level and operate in a first burst mode while the DC input power is at a second level; wherein, during the continuous mode, the DC input power is continuously converted into AC output power and applied to an AC power grid and, during the first burst mode, a first period of energy storage is immediately followed by a burst of AC output current generated for half of a particular grid cycle and immediately followed by a second period of energy storage, wherein each of the first and the second periods of energy storage lasts an integer number of grid voltage periods during which the DC-AC inverter does not generate any output power.

9. The apparatus of claim 8 wherein each of the first and the second periods of energy storage is for (($N_{off}/2$) rounded up to the nearest integer) AC grid voltage cycles, wherein $N_{off}$ is the number of grid cycles of energy storage when AC output power is burst for a full grid-cycle.

10. The apparatus of claim 9 wherein the at least one controller is further configured for calculating the current to be generated by the DC-AC inverter during the burst, $I_B$, as $I_{req}*(2*(new\ N_{off})+1)$, wherein new $N_{off}=((N_{off}/2)$ rounded up to the nearest integer), and wherein $I_{req}$ is a required AC output current from the DC-AC inverter.

11. The apparatus of claim 8 wherein the polarity of subsequent bursts of AC output current following the burst of AC output current automatically alternates.

12. The apparatus of claim 8 wherein the at least one controller is further configured for:
   calculating the current to be generated by the DC-AC inverter during a burst when operating in a second burst mode as $I_{req}*(2*N_{off}+1)$; and
   operating the DC-AC inverter in the second burst mode, wherein, when operating in the second burst mode, each energy storage period lasts $N_{off}$ AC grid voltage cycles, wherein $N_{off}$ is the number of grid cycles of energy storage when AC output power is burst for a full grid-cycle, and wherein $I_{req}$ is a required AC output current from the DC-AC inverter.

13. The apparatus of claim 12 wherein the at least one controller is further configured for:
   selecting the first burst mode if $I_{req}$ is greater than a maximum rating for the DC-AC inverter; and
   selecting the second burst mode if $I_{req}$ is not greater than the maximum rating for the DC-AC inverter.

14. The apparatus of claim 12 wherein the at least one controller is further configured for selecting a burst mode from the first or the second burst mode based on the burst mode which harvests a greater amount of energy.

15. A system for converting DC input power into AC output power comprising:
- a photovoltaic (PV) module for providing the DC input power; and
- an inverter, coupled to the PV module, comprising at least one controller for operating the inverter in a continuous mode while the DC input power is at a first level and operating the inverter in a first burst mode while the DC input power is at a second level; wherein, during the continuous mode, the DC input power is continuously converted into AC output power and applied to an AC power grid and, during the first burst mode a first period of energy storage is immediately followed by a burst of AC output current generated for half of a particular grid cycle and immediately followed by a second period of energy storage, wherein each of the first and the second periods of energy storage lasts an integer number of grid voltage periods during which the inverter does not generate any output power.

16. The system of claim 15 wherein each of the first and the second periods of energy storage is for (($N_{off}$/2) rounded up to the nearest integer) AC grid voltage cycles, wherein $N_{off}$ is the number of grid cycles of energy storage when AC output power is burst for a full grid-cycle.

17. The system of claim 16 wherein the at least one controller is further configured for calculating the current to be generated by the inverter during the burst, $I_B$, as $I_{req}*(2*$(new $N_{off}$)+1), wherein new $N_{off}$=(($N_{off}$/2) rounded up to the nearest integer), and wherein $I_{req}$ is a required AC output current from the inverter.

18. The system of claim 15 wherein the polarity of subsequent bursts of AC output current following the burst of AC output current automatically alternates.

19. The system of claim 15 wherein the at least one controller is further configured for:
- calculating the current to be generated by the inverter during a burst when operating in a second burst mode as $I_{req}*(2*N_{off}+1)$; and
- operating the inverter in the second burst mode, wherein, when operating in the second burst mode, each energy storage period lasts $N_{off}$ AC grid voltage cycles, wherein $N_{off}$ is the number of grid cycles of energy storage for bursting for a full grid-cycle, and wherein $I_{req}$ is a required AC output current from the inverter.

20. The system of claim 19 wherein the at least one controller is further configured for:
- selecting the first burst mode if $I_{req}$ is greater than a maximum rating for the inverter; and
- selecting the second burst mode if $I_{req}$ is not greater than the maximum rating for the inverter.

* * * * *